No. 649,277. Patented May 8, 1900.
A. DE DION & G. BOUTON.
VALVE FOR EXPLOSION MOTORS.
(Application filed Aug. 3, 1898.)

(No Model.) 3 Sheets—Sheet 1.

No. 649,277. Patented May 8, 1900.
A. DE DION & G. BOUTON.
VALVE FOR EXPLOSION MOTORS.
(Application filed Aug. 3, 1898.)

(No Model.) 3 Sheets—Sheet 2.

No. 649,277. Patented May 8, 1900.
A. DE DION & G. BOUTON.
VALVE FOR EXPLOSION MOTORS.
(Application filed Aug. 3, 1898.)

(No Model.) 3 Sheets—Sheet 3.

Witnesses Inventors
Albert de Dion
Georges Bouton
By James L. Norris,
Atty

United States Patent Office.

ALBERT DE DION AND GEORGES BOUTON, OF PUTEAUX, FRANCE.

VALVE FOR EXPLOSION-MOTORS.

SPECIFICATION forming part of Letters Patent No. 649,277, dated May 8, 1900.

Application filed August 3, 1898. Serial No. 687,656. (No model.)

*To all whom it may concern:*

Be it known that we, ALBERT DE DION and GEORGES BOUTON, citizens of France, residing at Puteaux, France, have invented certain new and useful Improvements in Explosion-Motors, of which the following is a specification.

This invention relates to means for fixing the suction pipe and valve in explosion-motors and permitting of the rapid taking to pieces of these parts.

In order that the invention may be readily understood, we will describe the same fully with reference to the annexed drawings, in which—

Figure 1:
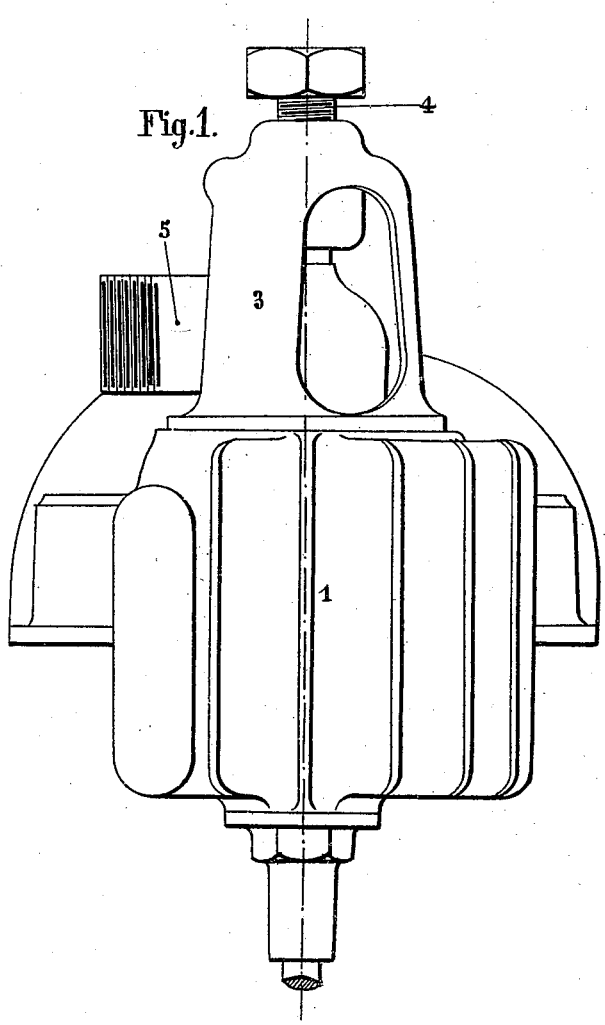
Figure 2:
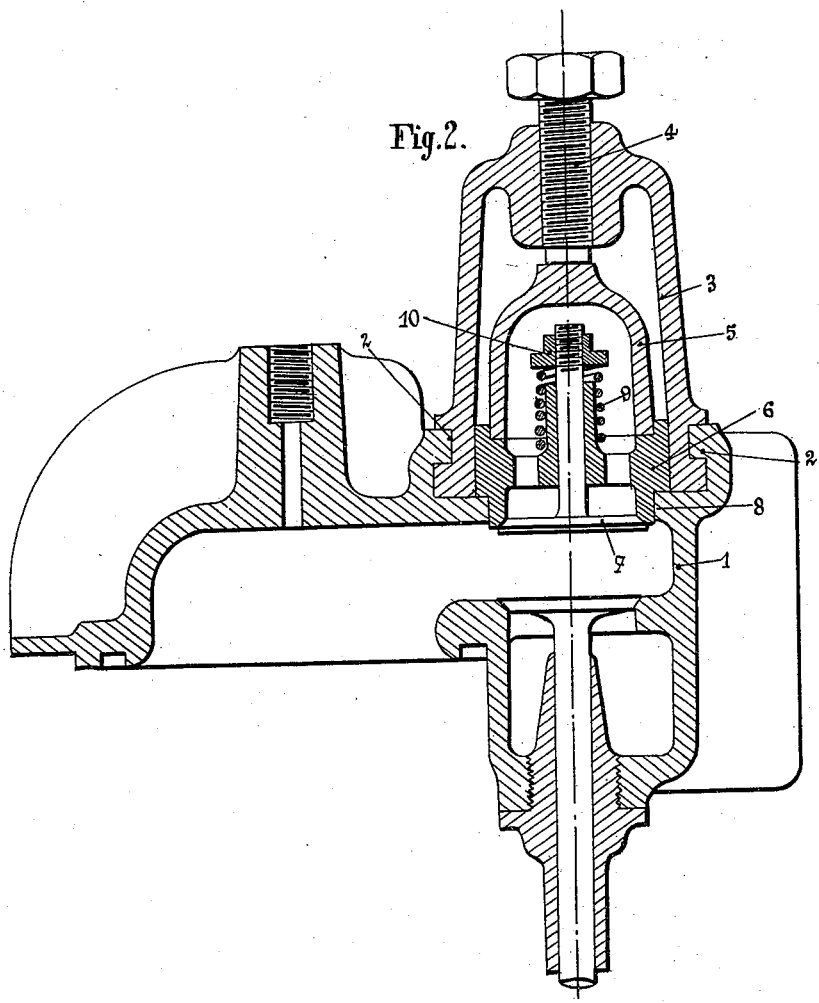
Figure 3:
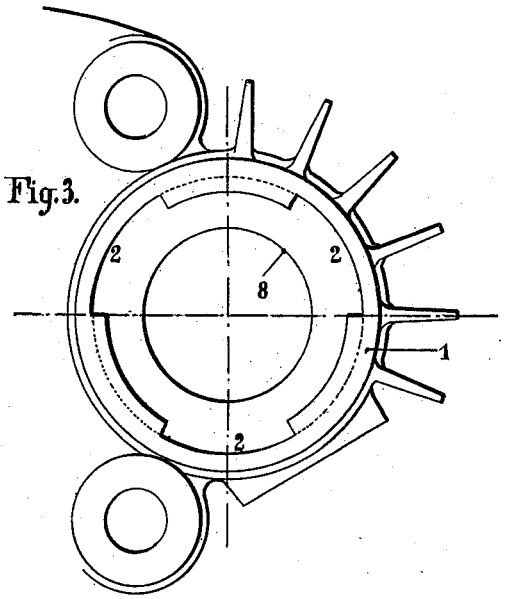

Figure 1 is an elevation of the arrangement; Fig. 2, a vertical axial section thereof, and Fig. 3 a plan of the valve-box of the motor.

In the valve-box of the motor are cut or formed three sectors 2 2 2 to allow a slotted or perforated bell or cover 3 to be fixed by means of a bayonet-joint arrangement and through the upper part of which bell passes a screw 4. The bell 3 fits over the suction-tube 5 and is connected to the valve-box in the manner described.

The numeral 6 indicates an annular ring separate from the valve-box, provided with a seat 8 for the wall of the valve-box surrounding the opening therein and on its opposite sides provided with seats, respectively, for the suction-valve 7 and the suction-tube 5. As shown in the drawings, the ring is arranged in the box, the wall of which is received in the seat 8 of said ring.

9 is the spring, and 10 the cap of the suction-valve 7.

Having thus described the invention, we will now explain its working.

It will be seen that it is only necessary to screw down into the bell 3 the screw 4, so as to firmly press the suction-pipe 5 onto the seat 6 of the suction-valve 7 and this seat 6 onto the bearing 8 in the valve-box 1. The taking to pieces can be effected by unscrewing the screw 4 and detaching the coupling of the suction-pipe 5, when the bell 3 may be turned and removed. The advantages of this arrangement are the following: first, facility for taking to pieces by reason of the bayonet-joint of the bell and by the fixing by aid of the single screw, and, second, a better cooling by reason of the circulation of air in the interior of the slotted or perforated bell or cover.

Having thus described our invention, we claim—

1. The combination with a valve-box of an explosive-motor, of a separate annular ring having upon one side a seat for the suction-valve and a seat for the wall of the box-opening and upon the other side a seat for the suction-tube, a bell surrounding said ring and having detachable connection with the said box, a suction-tube inclosed by the bell and having one end seated on the said ring, and a screw threaded through the end of the bell and bearing against the outer end of the suction-tube, as and for the purpose specified.

2. The combination with the valve-box of an explosive-motor having sectors, of an annular ring resting upon an annular bearing on said box, a suction-valve seated against the under side of said ring, a perforated bell having means for engagement with said sectors to form a bayonet-joint connection with the valve-box and disposed between said ring and the outer wall of the box, a suction-tube resting against the upper face of said ring and inclosed by the bell, and a screw threaded into the outer end of the bell and bearing directly upon the suction-tube, as and for the purpose specified.

In testimony whereof we have hereunto set our hands in presence of two subscribing witnesses.

ALBERT DE DION.
GEORGES BOUTON.

Witnesses:
ALFRED FRELL,
EDWARD P. MACLEAN.